(12) United States Patent
Hsien

(10) Patent No.: US 6,784,799 B2
(45) Date of Patent: Aug. 31, 2004

(54) TENSION METER AND WRENCH ARRANGEMENT

(76) Inventor: Chih-Ching Hsien, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/213,400

(22) Filed: Aug. 7, 2002

(65) Prior Publication Data

US 2004/0027250 A1 Feb. 12, 2004

(51) Int. Cl.⁷ .......................... G08B 21/00; B25B 23/14
(52) U.S. Cl. ................. 340/668; 73/862.21; 73/862.23; 81/177.1
(58) Field of Search .......................... 340/668; 73/1.09, 73/1.11, 1.12, 862.08, 862.21, 862.23, 862.27; 81/52, 467, 479, 177.1

(56) References Cited

U.S. PATENT DOCUMENTS

| | | | | |
|---|---|---|---|---|
| 2,315,521 A | * | 4/1943 | Hart | 73/862.26 |
| 4,125,016 A | * | 11/1978 | Lehoczky et al. | 73/862.23 |
| 4,327,611 A | * | 5/1982 | Catanese et al. | 81/177.9 |
| 4,669,319 A | * | 6/1987 | Heyraud | 73/862.23 |
| 4,864,841 A | * | 9/1989 | Heyraud | 73/862.21 |
| 4,976,133 A | * | 12/1990 | Pohl | 73/1.11 |
| 5,109,737 A | * | 5/1992 | Raber | 81/177.2 |
| 6,092,442 A | * | 7/2000 | Macor | 81/180.1 |
| 6,463,811 B1 | * | 10/2002 | Putney | 73/862.21 |
| 2003/0167884 A1 | * | 9/2003 | Macor | 81/177.1 |

* cited by examiner

Primary Examiner—Brent A. Swarthout
Assistant Examiner—Anne V. Lai

(57) ABSTRACT

A tension meter and wrench arrangement is constructed to includes a resistance type tension meter and an integrated device installed in a wrench, the integrated device providing a voltage output corresponding to the variation of resistance detected by the tension meter and converting the voltage output into digital signal for display through a display screen, the wrench having a sliding sleeve adapted for protecting the integrated device.

1 Claim, 7 Drawing Sheets

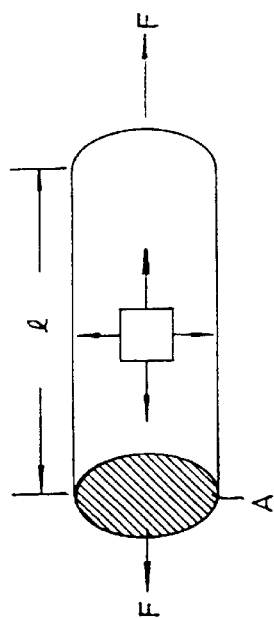
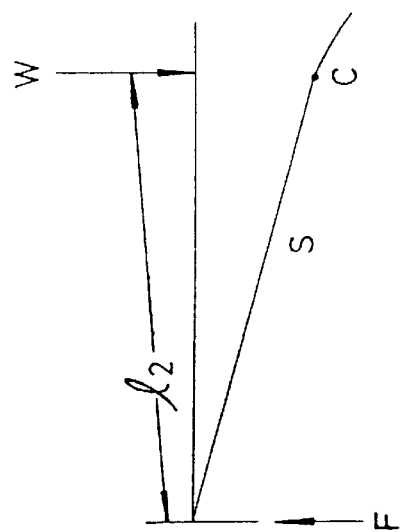
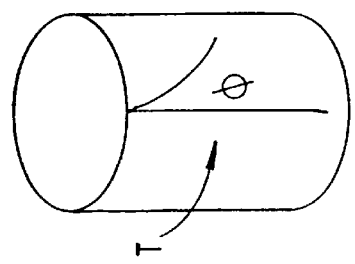
Fig. 2

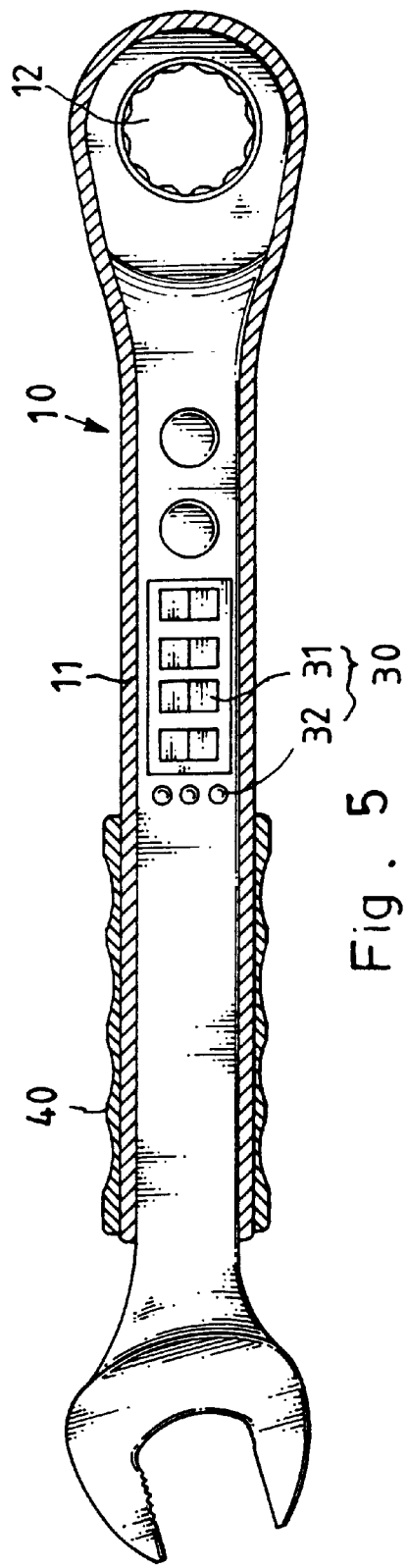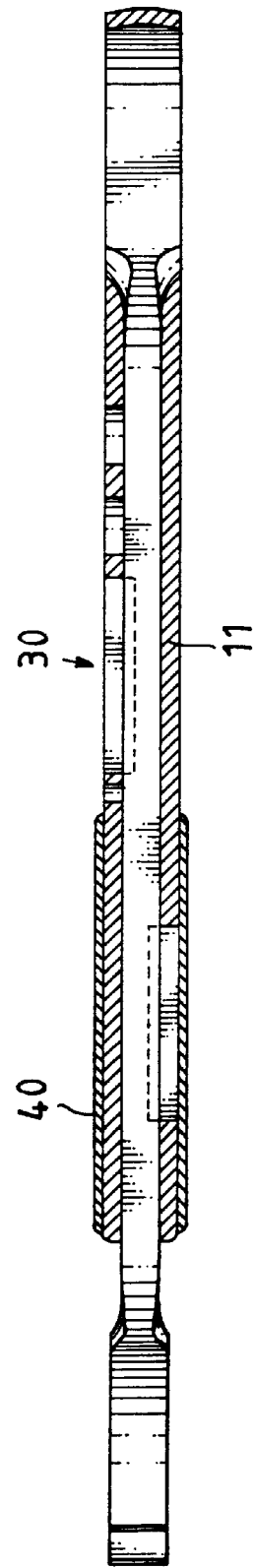

TENSION METER AND WRENCH ARRANGEMENT

BACKGROUND OF THE INVENTION

The present invention relates to wrenches, and more specifically, to a tension meter and wrench arrangement that displays the tension of the wrench upon operation of the wrench.

When operating a wrench, the user can only estimate the tension of the wrench by experience. However, it is not accurate to estimate the tension of the wrench by experience. When applied an excessively high torsional force to the wrench, the wrench may be forced to break, causing an accident. In order to eliminate this problem, wrenches with tension indicator means are developed. FIGS. 7 and 8 show two ratchet wrenches with electronic type tension indicator means according to the prior art. Because the electronic type tension indicator means occupies much installation space, the installation of the electronic type tension indicator means affects the convenience of the operation of the wrench. Further, because the electronic type tension indicator means is disposed outside the wrench, it tends to be damaged accidentally.

SUMMARY OF THE INVENTION

The present invention has been accomplished under the circumstances in view. It is one object of the present invention to provide a tension meter and wrench arrangement, which accurately indicates the tension of the wrench during the operation of the wrench. It is another object of the present invention to provide a tension meter and wrench arrangement, which requires less installation space in the wrench. It is still another object of the present invention to provide a tension meter and wrench arrangement, which has means to protect the electronic parts thereof when not in use. According to one aspect of the present invention, the tension meter and wrench arrangement comprises a resistance type tension meter and an integrated device installed in a wrench, the integrated device providing a voltage output corresponding to the variation of resistance detected by the tension meter and converting the voltage output into digital signal for display through a display screen, the wrench having a sliding sleeve adapted for protecting the integrated device. According to another aspect of the present invention, a sliding sleeve is axially slidably mounted on the handle of the wrench and adapted for protecting the integrated device when the wrench is not in use.

BRIEF DESCRIPTION OF THE DRAWINGS

FIG. 2 is a schematic drawing analyzing the condition, of materials when received a torsional force.

FIG. 4 is a sectional side assembly view of the present invention.

FIG. 5 is a sectional top assembly view of the present invention.

DETAILED DESCRIPTION OF THE PREFERRED EMBODIMENT

Figure 1:
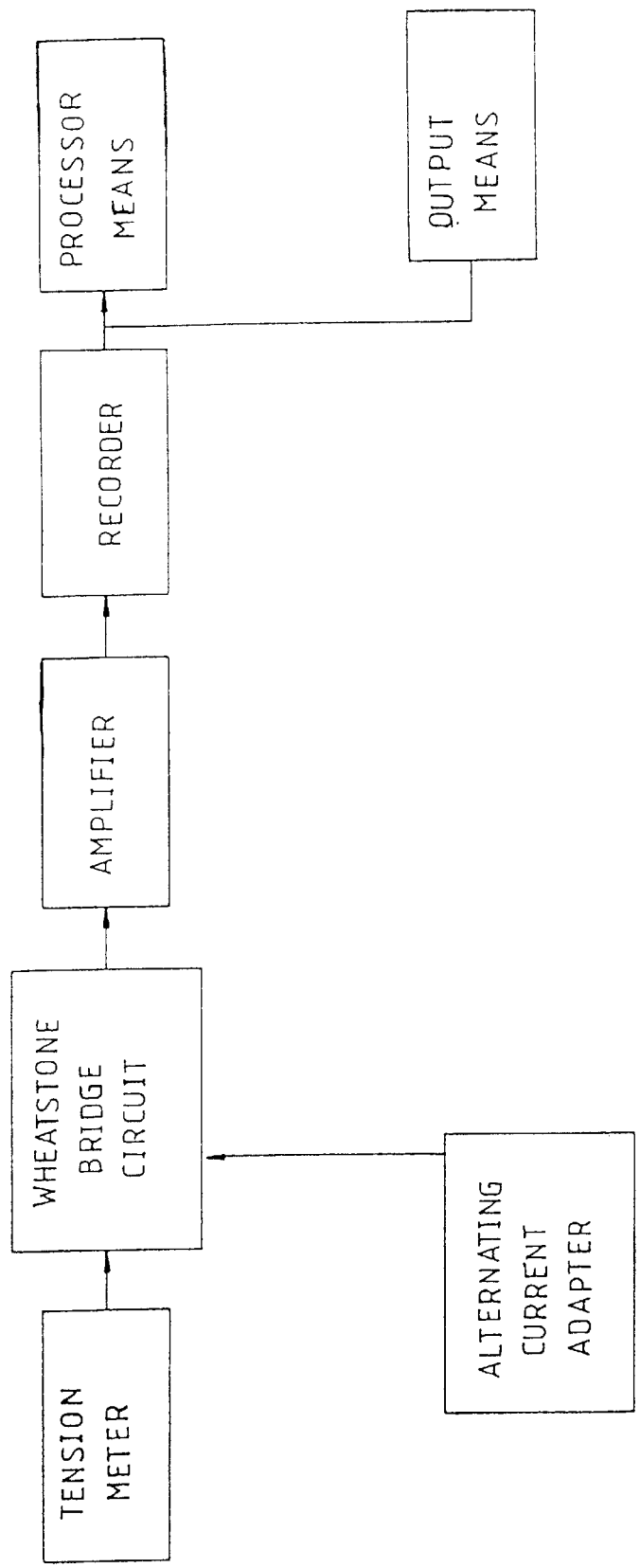
FIG. 1 is a circuit block diagram of the present invention.
Figure 3:
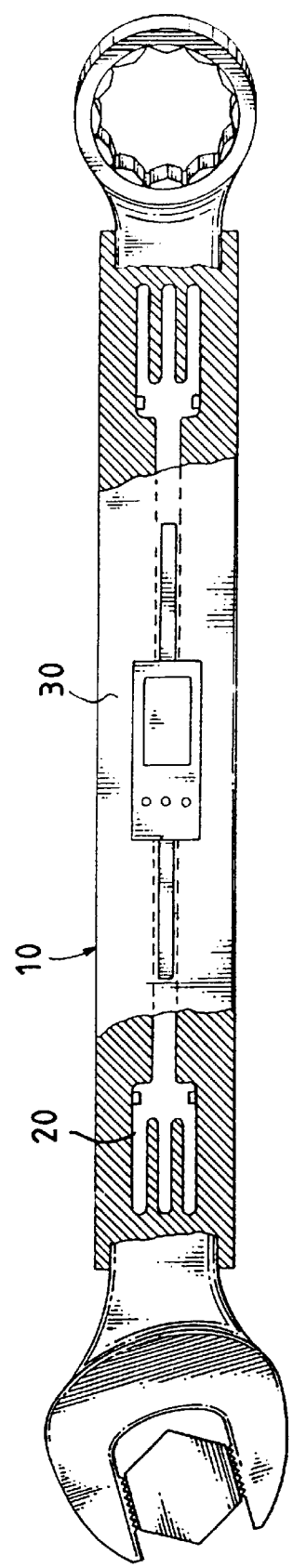
FIG. 3 is a sectional elevation of the present invention.

Referring to FIGS. from 1 through 6, the invention comprises a wrench 10, a resistance type tension meter 20, and an integrated device 30. The wrench 10 comprises a handle 11 and at least one work head 12. The resistance type tension meter 20 and the integrated device 30 are installed in the wrench 10. The resistance type tension meter 20 is disposed near the two distal ends of the handle 11. The integrated device 30 is mounted on the middle of the handle 11, comprising a display screen (output means) 31 and a set of control buttons 32 disposed on the outside of the handle 11 and electrically connected to the tension meter 20 for output of tension value detected by the tension meter 20 upon operation of the wrench 10.

FIG. 1 shows the circuit design of the present invention. FIG. 2 explains the circuit design of the present invention, in which S: length of arc; l2: length of the force receiving unit; C: bearing point. When received the load F, S>δ2, a tension is produced to deform the tension meter 20, thereby causing Wheatstone Bridge Circuit to provide a voltage output indicative of the amount of deformation of the tension meter 20. As shown in FIG. 2, when the cylinder bears a torque T, it produced an angular change and changes the voltage output, therefore, $R = p \times l/A$ in which, R: resistance; l: length; A: unit area; p: coefficient of resistance. According to this equation, resistance value is directly proportional to unit length, but indirectly proportional to unit area. The output voltage signal from Wheatstone Bridge Circuit is then amplified through Amplifier, and then recorded by Recorder, and then converted from analog signal into digital signal by Processor Means for outputting through Output Means, namely, the aforesaid display screen 31.

Figure 6:
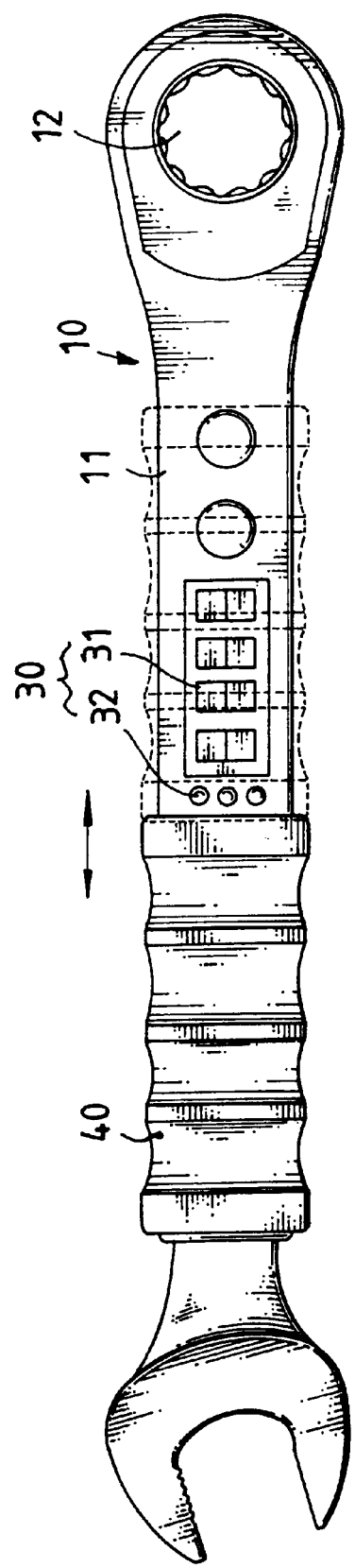
FIG. 6 is a schematic drawing of the present invention showing the sliding sleeve moved on the handle of the wrench between two positions.
Figure 7:
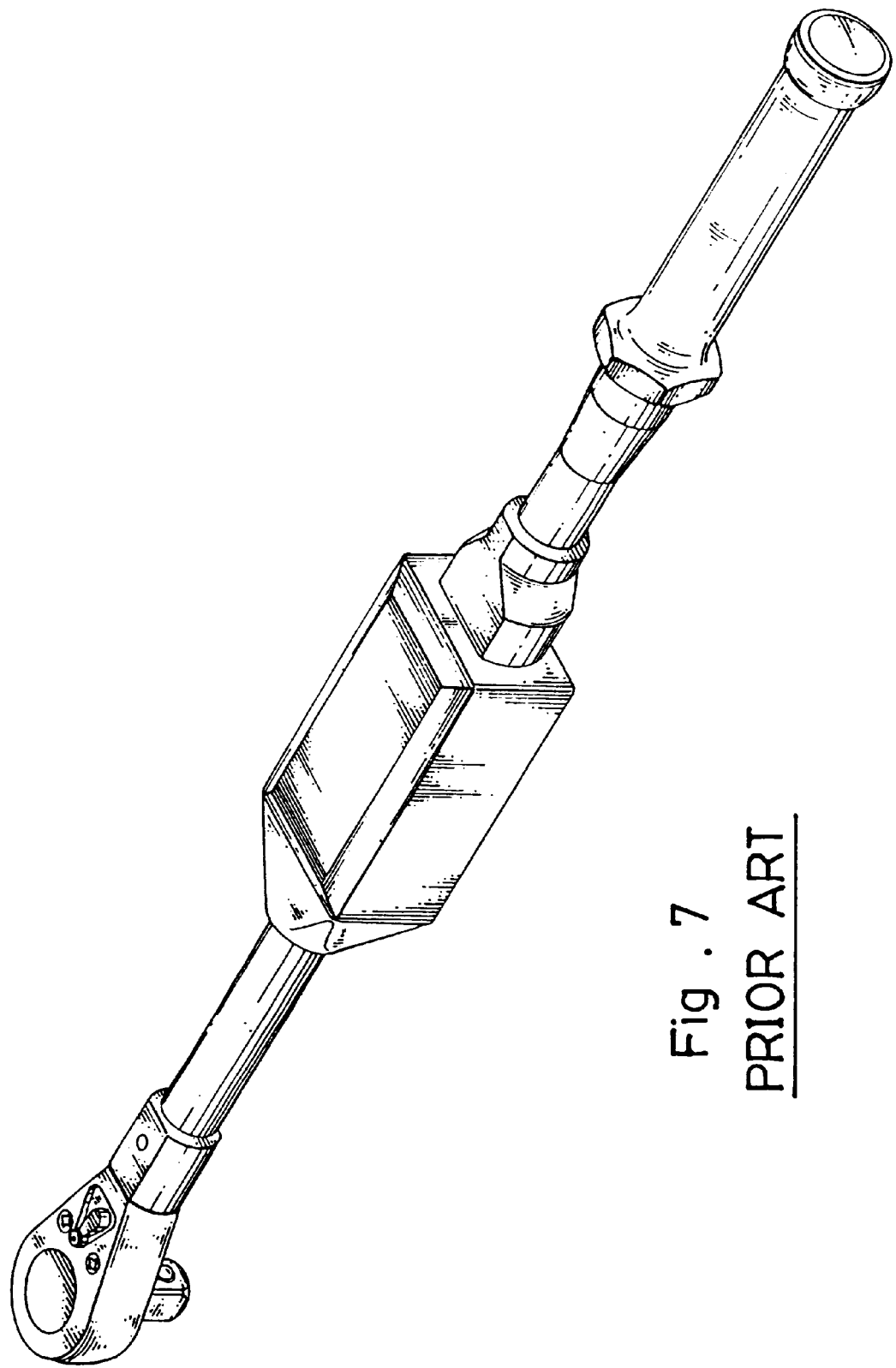
FIG. 7 is a perspective view of a wrench with electronic tension display means according to the prior art.
Figure 8:
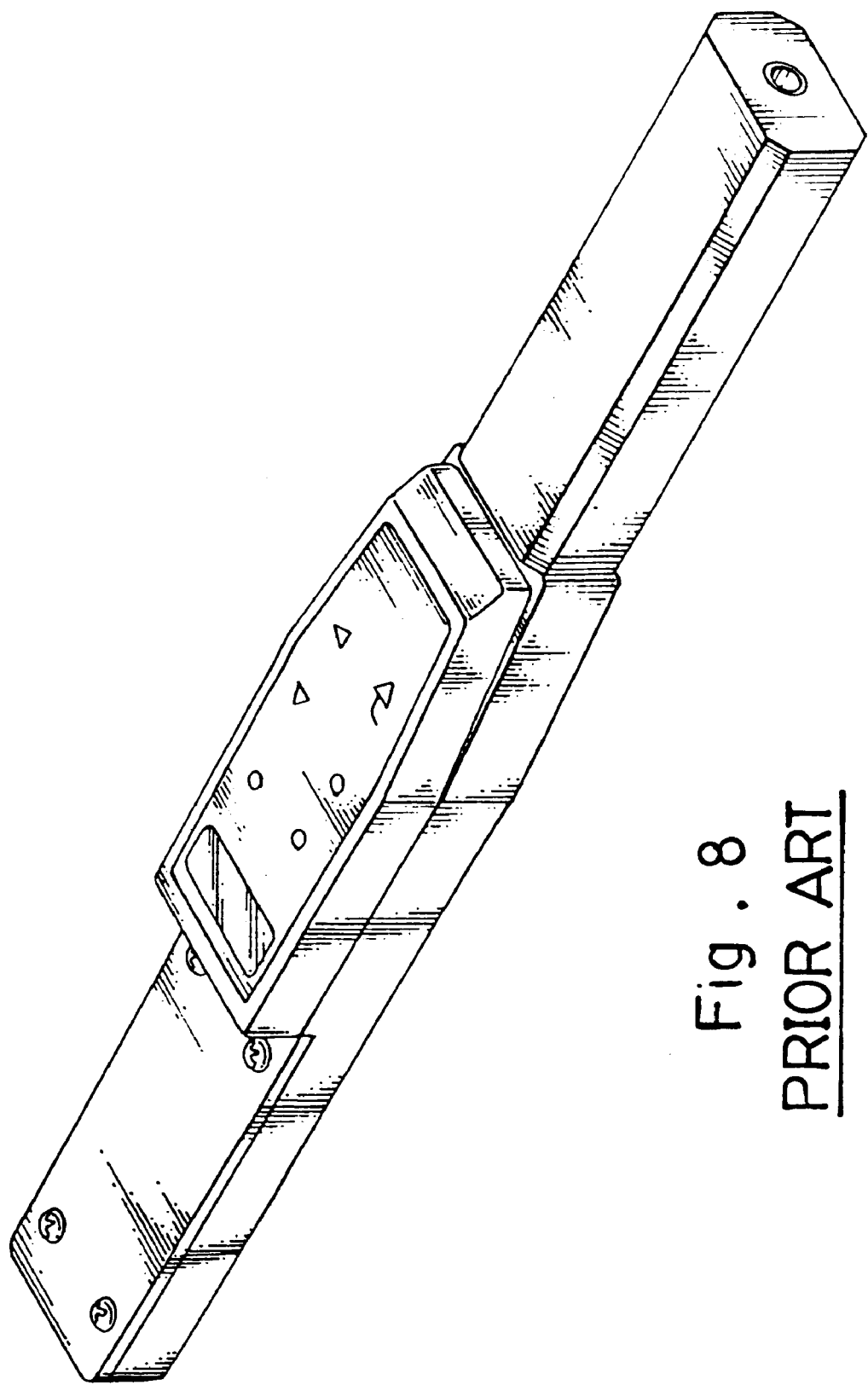
FIG. 8 is a perspective view of a wrench with photosensitive type electronic tension display means according to the prior art.

Referring to FIG. 6 again, the wrench 10 further comprises a sliding sleeve 40 axially slidably mounted on the handle 11 and moved between a first position where the resistance type tension meter 20 is seen, and a second position where the resistance type tension meter 20 is kept from sight and well protected by the sliding sleeve 40.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A tension meter and a wrench arrangement comprising:
   a wrench;
   a tension meter mounted inside said wrench and adapted for detecting the tension of the said wrench upon operation of said wrench,
   an integrated device mounted on said wrench and electrically connected to said tension meter for signal output, said integrated device comprising:
      a Wheatstone bridge circuit, which provides a voltage output signal indicative of the amount of tension detected by said tension meter upon operation of said wrench,
      an amplifier, which amplifies the voltage output signal of said Wheatstone bridge circuit, a recorder, which records the amplifier voltage output signal outputted from said amplifier, process means, which converts the amplified voltage output signal outputted from said amplifier into a corresponding digital signal outputted from said amplifier into a corresponding digital signal, and output means, which displays the digital signal outputted from said processor means;

a sliding sleeve axially slidably mounted thereon and adapted for protecting said integrated device;

wherein the wrench comprises a handle and two work heads, one head is a biforked head and another head is a ring head; the tension meter and the integrated circuit are installed in the wrench; the tension meter is disposed near the two distal ends of the handle; the output means comprises a screen and a set of control buttons disposed on an outside of the handle and electrically connected to the tension meter.

* * * * *